(12) United States Patent
Greis et al.

(10) Patent No.: US 7,436,827 B2
(45) Date of Patent: Oct. 14, 2008

(54) DATA BEARERS IN A COMMUNICATION SYSTEM

(75) Inventors: Marc Greis, Irving, TX (US); Juha Kalliokulju, Vesilahti (FI); Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 927 days.

(21) Appl. No.: 10/275,331

(22) PCT Filed: May 7, 2001

(86) PCT No.: PCT/EP01/05123

§ 371 (c)(1),
(2), (4) Date: May 19, 2003

(87) PCT Pub. No.: WO01/86974

PCT Pub. Date: Nov. 15, 2001

(65) Prior Publication Data

US 2004/0022266 A1   Feb. 5, 2004

(30) Foreign Application Priority Data

May 8, 2000   (GB) .................................. 0011058.5

(51) Int. Cl.
*H04L 12/28* (2006.01)
*H04L 12/56* (2006.01)

(52) U.S. Cl. ...................... 370/389; 370/392; 370/400; 370/401

(58) Field of Classification Search .................. 370/467, 370/401, 466, 230, 231, 235, 236, 319, 320, 370/321, 322, 341, 342, 352, 395.5, 395.21, 370/395.52, 400, 426

See application file for complete search history.

(56) References Cited

U.S. PATENT DOCUMENTS

| | | | |
|---|---|---|---|
| 6,608,814 B1 * | 8/2003 | Libman et al. | 370/230 |
| 6,654,610 B1 * | 11/2003 | Chen et al. | 455/450 |
| 6,937,566 B1 * | 8/2005 | Forslow | 370/231 |
| 6,965,579 B1 * | 11/2005 | Shin | 370/312 |
| 7,310,322 B2 * | 12/2007 | Graf et al. | 370/328 |
| 2001/0054103 A1 * | 12/2001 | Chen | 709/226 |
| 2002/0132611 A1 * | 9/2002 | Immonen et al. | 455/414 |
| 2003/0060210 A1 * | 3/2003 | Ravishankar et al. | 455/452 |
| 2003/0186692 A1 * | 10/2003 | Tamura | 455/422.1 |
| 2005/0091409 A1 * | 4/2005 | Williams et al. | 709/247 |
| 2005/0226193 A1 * | 10/2005 | Karhiniemi et al. | 370/338 |

FOREIGN PATENT DOCUMENTS

WO   WO 99/17497   4/1999
WO   WO 00/10357   2/2000

* cited by examiner

*Primary Examiner*—Firmin Backer
*Assistant Examiner*—Farah Faroul
(74) *Attorney, Agent, or Firm*—Squire, Sanders & Dempsey, LLP

(57) ABSTRACT

The present invention relates to provision of data bearers in a communication system (2) comprising a first node (1) and a second node (4). A message is generated that associates with provision of control of a data bearer between the nodes (1,4), said message being based on a data bearer control protocol. Information that associates with responsibilities regarding a quality of service function of the data bearer is included in the message. The message is then transported between the nodes (1,4). The quality of service function of the data bearer is controlled by a control node (1,16) that has been selected based on said information added in the message.

45 Claims, 2 Drawing Sheets

DATA BEARERS IN A COMMUNICATION SYSTEM

FIELD OF THE INVENTION

The present invention relates to a communication system, and in particular, but not exclusively, to provision of end-to-end data bearers in a communication system.

BACKGROUND OF THE INVENTION

Telecommunications networks typically operate in accordance with a given standard or specification which sets out what the various elements of the network are permitted to do and how that should be achieved. For example, the standard or specification may define whether the user, or more precisely, user equipment or terminal is provided with circuit switched and/or packet switched service. Communication protocols and/or parameters which shall be used for the connection may also be defined for the network. In other words, in order to enable communication in the network, a specific set of "rules" on which the communication can be based on needs to be defined. Examples of the different standards and/or specifications for wireless communication include, without limiting to these, specifications such as GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access) or TD/CDMA in UMTS (Time Division/Code Division Multiple Access in Universal Mobile Telecommunications System), IMT 2000 (International Mobile Telecommunications system 2000), i-Phone and so on.

In a typical wireless cellular communication system a base station serves mobile stations or similar terminal apparatus or user equipment via a wireless interface. Each of the cells of the cellular system can be served by an appropriate transceiver apparatus. For example, in the WCDMA radio access network (RAN) the cell is served by a transceiver element referred to as Node B, which is connected to and controlled by a controller node referred to as a radio network controller (RNC). In the GSM radio network the cell is served by a transceiver element referred to as base station (BTS), which is connected to and controlled by a node referred to as a base station controller (BSC). The BSC/RNC node may be connected to and controlled by a mobile switching center (MSC), a serving GPRS support node (SGSN) or similar facility. The controllers of a network are typically interconnected and there may be one or more gateways, such as a Gateway MSC (GMSC) or a Gateway GPRS support node (GGSN), for connecting the cellular network to other networks, such as to circuit or packet switched telephone network or a data network, such as an Internet Protocol (IP) or X.25 based data network. The gateway node provides one or several access points for the network to another network, that is a connection point between the two networks.

As mentioned above, the telecommunications network may be capable of providing wireless packet switched services for the mobile stations. Examples of such networks include the GPRS (General Packet Radio Service) network, EDGE (enhanced data rate for GSM evolution) Mobile Data Network and third generation telecommunication systems such as the Universal Mobile Telecommunication System (UMTS). From these the GPRS standard is provided in conjunction with the GSM (Global System for Mobile communications) standard. The GSM standard is a circuit switched service and is originally designed for speech services. There are elements of the GSM standard and the GPRS standard which are in common. The GPRS networks are described in more detail e.g. in 3GPP Technical Specification 3G TS 23.060 version 3.2.0, "General Packet Radio Service (GPRS); Service description; Stage 2", January 2000. This document is incorporated herein by reference. An adaptation of the GPRS standard is also being proposed for use with the third generation UMTS. The packet data part of the UMTS is contained in the above referenced 23.060 specification, i.e. 23.060 applies for packet switched data both for the UMTS and the GPRS.

Data may be transmitted in a data transmission entity that is in some protocols referred to as a service data unit (SDU). The data units may be transferred via the network based on an appropriate protocol adapted to enable transportation of packet switched data, such as via a so called Packet Data Protocol (PDP) context. More particularly, the PDP context refers to the part of the data connection or data bearer that goes through the packet switched network (e.g. the GPRS/UMTS network). The PDP context can be seen as a logical connection from the wireless station to the access point of a gateway node, such as the GGSN, the access point being the connection point between the e.g. GPRS/UMTS mobile network and an external data network. The PDP context may also be referred to, instead of the term logical connection, as a logical association between the access point and the user.

The UMTS network will be used to access a range of different networks for a range of applications. This requires that so called end-to-end quality of service (QoS) can be provided between the termination points of the connection. The end-to-end QoS refers to a common level of service quality throughout the connection between the two signaling points or nodes between which the connection is established. For example, the released GPRS and UMTS specifications specify four traffic classes for the quality of service (QoS): conversational, streaming, interactive and background.

The quality of service parameters for a data bearer are typically set by means of a negotiation mechanism between two domains of the communication system. For example, in the present UMTS proposals, an end-to-end negotiation of the quality of service (QoS) will be used between the packet switched (PS) domains in the UMTS system or between PS domains in a UMTS network and an external network (fixed or wireless) to provide the mobile terminals in the UMTS network with an end-to-end bearer. The end-to-end QoS negotiation may be initiated by the mobile terminal or a node of the network, typically the gateway node: The mobile terminal may also cooperate with the gateway node for achieving an end-to-end QoS.

An appropriate protocol, such as the Resource Reservation Protocol (RSVP), may be used for the negotiation procedure for the end-to-end QoS between signalling points in the UMTS/GRPS networks and/or signalling points in other data networks. During a data dearer establishment procedure the RSVP QoS signalling may be carried e.g. by means of so called PDPcontext activation mechanism. The UMTS/GPRS QoS and the parameters thereof are defined in more detail e.g. in 3GPP Technical Specification 3G TS 23.107 version 3.1.0, "QoS Concept and Architecture", October 1999. A more detailed description of the RSVP messages can be found e.g. from document by Braden, R., et al, "Resource ReSerVation Protocol (RSVP)—Version 1 Functional Specification", IETF RFC 2205, September 1997. These two documents are also incorporated herein by reference.

As briefly mentioned above, the end-to-end QoS negotiation may be initiated and handled by the mobile terminal alone, for example, in instances where the terminal equipment is provided with the required RSVP capabilities and where the terminal wants to rely on the RSVP. The gateway node may also initiate the QoS procedure on behalf of the terminal, for example if the terminal does not have any end-to-end negotiation capability or if the terminal does not want to, for some reason, rely on a protocol like the RSVP for providing the end-to-end QoS. However, the inventors have found that there is no appropriate mechanism for the mobile terminal to indicate to the gateway node whether the gateway node should handle the end-to-end QoS negotiation or not or if the mobile terminal wants to have this responsibility. Furthermore, the inventors have found that the gateway node may need to be able to indicate to the mobile terminal which capabilities the gateway node may provide and which capabilities the gateway node may use to negotiate the end-to-end QoS. The gateway may also need to be able to inform the mobile terminal of the current status of the end-to-end QoS negotiations. There are also other information concerning the QoS negotiations that may need to be transported between the nodes.

SUMMARY OF THE INVENTION

It is an aim of the embodiments of the present invention to address one or several of the problems that relate to the establishment of a data bearer between two nodes in a data communication system.

According to one aspect of the present invention, there is provided a method in a communication system for controlling at least one data bearer between a first node and a second node of the communication system, comprising: generating a message that associates with provision of control of a data bearer between the nodes; adding to the message information that associates with a quality of service function of the data bearer; transporting the message between the nodes; and assigning a node with responsibility of controlling the quality of service function of the data bearer based on said information added in the message.

According to another aspect of the present invention there is provided a communication system, comprising: a first node; a second node; means for establishing data bearers between the nodes; a controller for generating a message that associates with the control of a data bearer between the nodes and for adding to the message information regarding the responsibility to control at least one quality of service feature that associates with the data bearer between the nodes; and a controller for controlling the at least one quality of service function of the data bearer, said controller being selected based on said information added in the message.

According to another aspect of the present invention there is provided a data bearer service manager for a node of a communications system, comprising: means for generating a control protocol message that associates with provision of control of a data bearer in the communications system; and means for generating and adding to the message information regarding the responsibilities to control at least one quality of service function of the data bearer.

According to a still another aspect of the present invention there is provided a user terminal of a communications system, comprising means for generating a control protocol message that associates with provision of control of a data bearer in the communications system, and means for generating and adding to the message information regarding the responsibilities to control at least one quality of service function of the data bearer.

According to more specific embodiments, the first node may comprise a mobile station. The second node may comprise a gateway node or a controller node of the communication system. The information may define that the first or the second node shall provide the control function. The data bearer may be an end-to-end data bearer. The control of the quality of service function may comprise control of the quality of service function during set-up or modification operations of the data bearer. The provision of control may comprise negotiations between at least two nodes regarding the quality of service function. The added information may also comprise various other information such as information regarding the capabilities and/or functions and/or status of the nodes. The first node and the second node may belong to a first communication network, and the data bearer may be established between the first node and a node in a second communication network. The information transported between the nodes may relate to negotiations concerning the responsibility to negotiate with a node in a second communication network.

The embodiments of the invention provides a mechanism for passing information regarding responsibilities that associate with the quality of service function. A node may be informed of the needs of a terminal regarding end-to-end QoS for a data bearer. The embodiments may also provide a mechanism for passing information concerning the capabilities of the node and/or the terminal and the status of the QoS negotiations. A mobile station may be enabled to signal its requirements regarding the end-to-end QoS negotiation to at least one other element of the system. In some applications the user of the terminal may not need to pay for the end-to-end QoS if the user does not need any end-to-end features. In addition, unnecessary QoS negotiations may be avoided. Resources in external networks may also be saved if resources are only reserved in instances where the user actually needs the resources. In some embodiments the mobile station may base its decision making procedure regarding the QoS negotiations based on information from the network side.

BRIEF DESCRIPTION OF DRAWINGS

For better understanding of the present invention, reference will now be made by way of example to the accompanying drawings in which.

DESCRIPTION OF PREFERRED
EMBODIMENTS OF THE INVENTION

Figure 1:
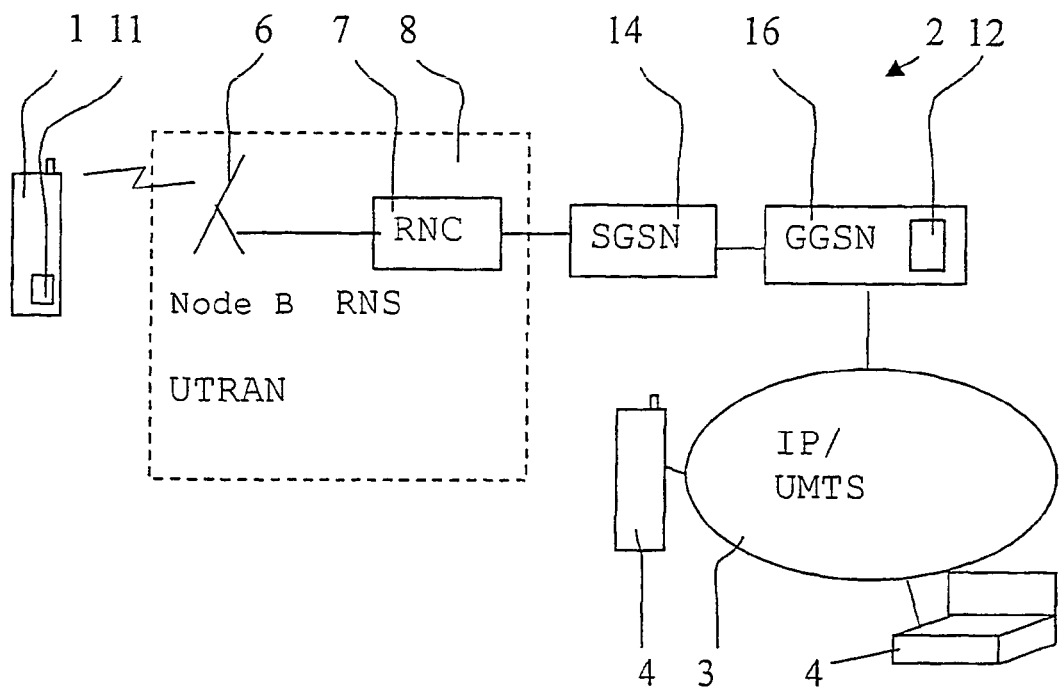
FIG. 1 shows one embodiment of the present invention.

Reference is made to FIG. 1 which shows a communication system in which the embodiments of the present invention may be employed. The area covered by the communication system is divided into a plurality of radio access areas that are typically referred to as cells (not shown). Each cell has associated therewith a base station 6. Depending on the standard being used by the network, the base station is sometimes referred to as node B, for example in the third generation standards. The term base station will be used in this document to encompass all elements which transmit to a mobile station 1. The term mobile station will be used in this document to encompass all user terminals or equipment which is capable of communicating with the base station via the air interface. The mobile station 1 may be associated with a data processor facility 11, as will be explained later.

The embodiment of the invention is described in the context of a UMTS (Universal Mobile Telecommunications System) and a GPRS (General Packet radio Service) and communications involving packet data. However, it should be appreciated that embodiments of the present invention are applicable to any other communication system which deals with packet data, non-packet data or even voice communication or the like, such as the IMT 2000, wireless LAN or different access networks.

The elements of a UMTS network system 2 will now be discussed in more detail. The mobile station 1 is arranged to communicate via the air interface with a respective base station 6. The base station is controlled by a radio network controller (RNC) 7. The radio network controller (RNC) and the base station may sometimes be referred to as the radio network subsystem (RNS) of a radio access network (RAN) 8. In the UMTS the RAN is typically referred to as UMTS terrestrial radio access network (UTRAN). It should be appreciated that a UMTS network is typically provided with more than one UTRAN and RNC. Each radio network controller (RNC) may also be arranged to control more than one base station 6 although only one base station is shown in FIG. 1. This is an implementation issue.

The radio access network 8 may be connected to a SGSN (serving GPRS support node) 14. The SGSN 14 keeps track of the mobile station's location and performs operations such as security functions and access control. The functions of the SGSN are defined e.g. in the referenced 3GPP specification 23.060. The SGSN 14 is connected to a GGSN (gateway GPRS support node) 16. The GGSN 16 provides interworking with external packet switched networks, i.e. the GGSN acts as a gateway between the UMTS data network 2 and an external network 3, such as an IP based data network or another UMTS network. The functions of a typical GGSN are also defined in the 3GPP specification.

FIG. 1 shows also user terminals 4 connected to the other network 3. An end-to-end bearer may be established e.g. between the mobile station 1 and one of the terminals 4. Data to be transmitted between the mobile station (MS) and any other node of the system may be speech data, video data or other data. Although not shown, the network system 2 may also be connected to conventional telecommunication networks, such as to a GSM based cellular public land mobile network (PLMN) or to a public switched telephone network (PSTN). The various networks may be interconnected to each other via appropriate interfaces and/or gateways.

Figure 2:
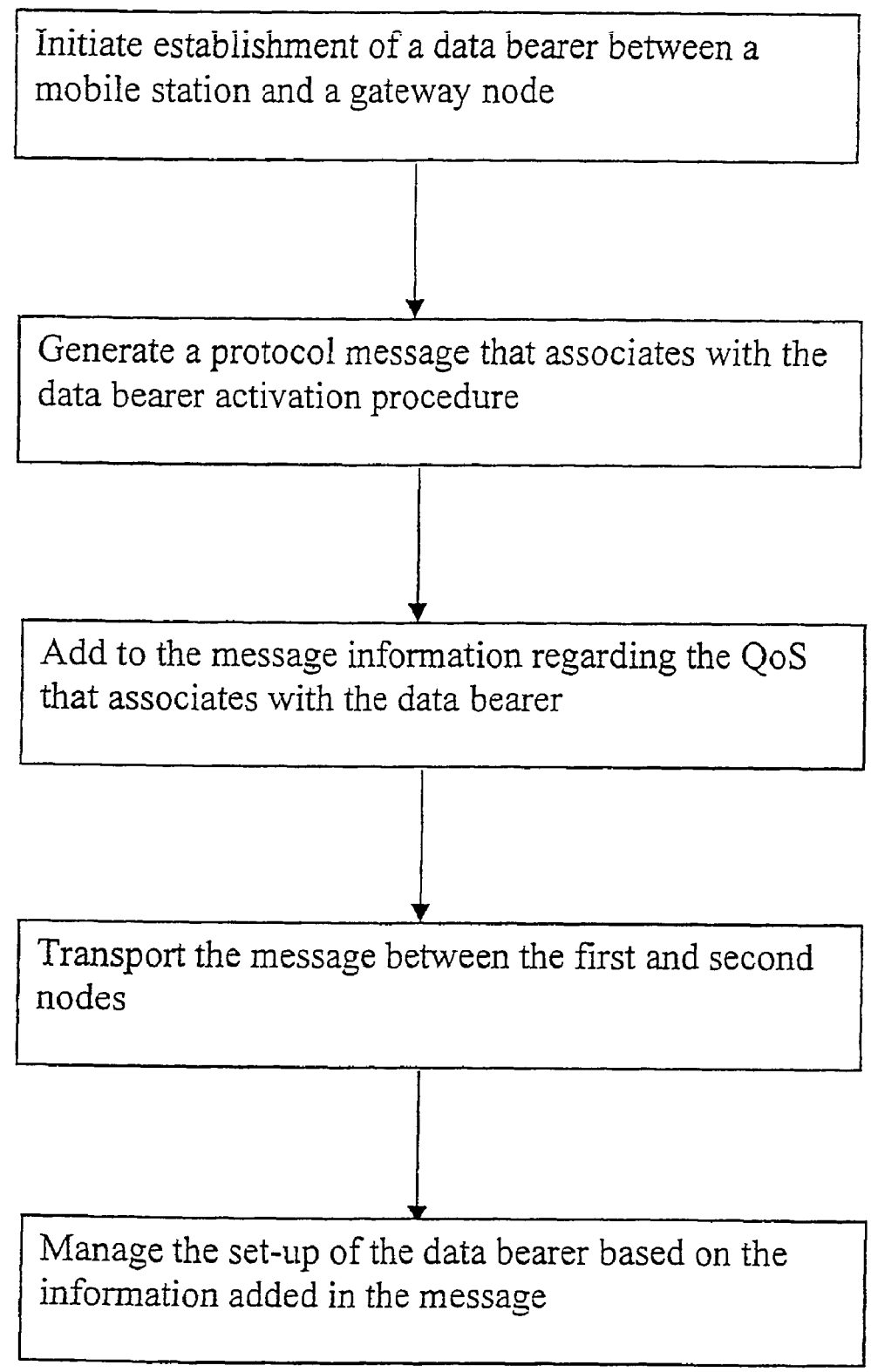
FIG. 2 is a flowchart illustrating the operation of one embodiment of the present invention.

FIG. 2 shows a flowchart for an embodiment of the present invention. The establishment of a data bearer between a mobile station and a gateway node is initiated. The initiation may be triggered e.g. in response to a request by the mobile user for a data bearer. A protocol message that associates with the data bearer activation procedure is generated, e.g. by a data bearer service manager of the mobile station. Information regarding responsibilities associated with the QoS of the data bearer is added in the message. This may also be accomplished by the data bearer service manager or any other appropriate function of the node generating the message. For example, the information may associate with the assignment of a node of the UMTS network that will have the responsibility to negotiate with element (or elements) of an external network. The selected node may then be the mobile station, the gateway or any other appropriate node of the network. The information to be added may also relate to one or several others of the QoS functions.

After generation of the message, it is transported between the first and second nodes. The set-up of the data bearer or any modification procedures of the data bearer is then managed based on the information added in the message.

Figure 3:
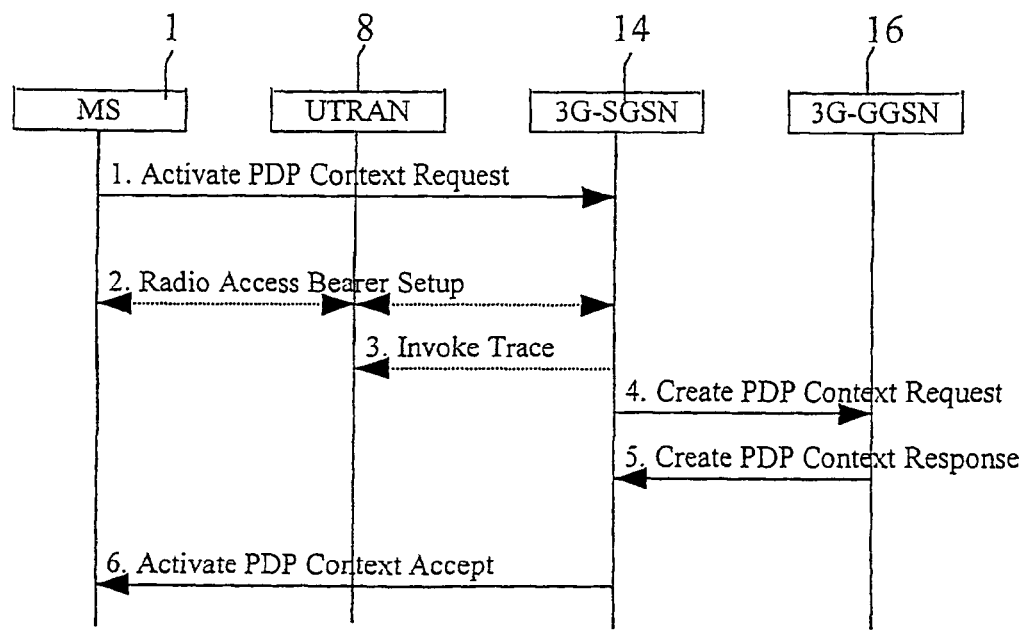
FIG. 3 is a signalling chart illustrating a context activation procedure in accordance with an embodiment of the present invention.

The following will describe in more detail, with reference to FIG. 3, an embodiment to enhance messages exchanged in a packet data protocol (PDP) context activation/modification procedure so that information that associates with the end-to-end QoS functions, such as the QoS negotiations may be included or embedded in the protocol messages.

More particularly, FIG. 3 shows a signalling chart for a PDP Context Activation Procedure. During the activation procedure various messages (denoted as messages 1 to 6) are transported between the mobile station 1, access network 8, controller 14 and gateway node 16 for establishing a data bearer between the mobile station 1 and the gateway node 16. The mobile station 1 adds information concerning the QoS negotiations to the messages (such as the 'Activate PDP Context Request' (1) and the 'Create PDP Context Request' (5)) from the mobile station 1 to the gateway 16. The context activation messages may be transported between the nodes based on any appropriate transport mechanism capable of transporting the messages between the nodes.

The mobile station or terminal 1 may add to the message an indication whether the end-to-end QoS negotiation should be performed by the GGSN 16 or not. This indication may be e.g. a flag included in the protocol message. The mobile station may also add a numeric value from a set of pre-defined values to indicate which end-to-end QoS negotiation mechanism the mobile station is using. For example: 0=No capability; 1=Unknown; 2=Not specified; 3=RSVP; 4=DiffServ; and so on.

According to a possibility the mobile station may add a value from a set of pre-defined values to indicate which end-to-end QoS negotiation mechanism the GGSN 16 should use. Instead of using predefined numeric values, any other appropriate indicators, such as alphabetic characters or any combination of numbers and/or characters may be used as the information carrying entity.

According to a further embodiment the gateway node 16 of the core network side of the communication network may also transport information to the mobile station 1 regarding the end-to-end negotiations. The activation messages from the GGSN 16 to the MS 1 may include messages such as the illustrated 'Create PDP Context Response' (message 5) and 'Activate PDP Context Accept' (message 6). The GGSN 16 may add to an activation message an indication for the mobile station 1 to signal whether the mobile station is allowed to request end-to-end QoS, if the mobile station 1 did do so in the 'Activate PDP Context Request' (message 1). This may be accomplished e.g. by a simple flag. The indication whether the mobile station is allowed to request an end-to-end QoS may be added by the gateway node 16. The indication, such as a flag, may also be added by the SGSN controller node 14.

As with regard to the mobile station 1, the GGSN 16 or the SGSN 14 may add an value from a set of pre-defined values to indicate which end-to-end QoS negotiation mechanism is to be used by the GGSN for this particular session. According to a possibility the GGSN 16 adds an indication for the mobile station 1 to signal the status of the end-to-end QoS negotiation. The status may be indicated e.g. by means of the following numeric values: 0=Unsuccessful, 1=Successful, 2=Pending, 3=Unknown. However, other indicators may also be used for this purpose.

According to an embodiment, if the gateway node 16 does not give any indication, the mobile station 1 interprets this as if the gateway node indicated that it does not have any end-to-end QoS negotiation capabilities. This may be required in some applications to ensure backwards compatibility with communications system that are implemented in accordance with older standards.

According to an embodiment, information is added in at least one message that is for modifying the properties of an already existing data bearer. For example, an information entity may be added in a PDP context modification protocol message instead of the activation protocol message. This embodiment may be used e.g. when the user of the mobile station 1 decides to modify the connection he/she already has. The operation principles of the PDP context modification protocol correspond to those of the activation protocol, apart from that the precondition that the bearer already exists.

According to an embodiment, instead of adding a new information element in the activation protocol messages, the information that associates with one or more of the quality of service functions is included in the activation or modification messages as a new QoS parameter. The parameter may be located in any appropriate location in the message structure.

It may be necessary to manage the QoS within each domain or node in order to be able to provide end-to-end QoS. An UMTS bearer service (BS) manager function may be implemented in the end nodes for controlling the bearer service. If the application involves interworking, the UMTS bearer service entities may be controlled by an internet protocol bearer service (IP BS)

FIG. 1 shows a UMTS BS Manager entities 11 and 12 that are implemented in association with the mobile station 1 and the gateway node 16, respectively. The BS manager may use any appropriate mechanism to manage a bearer service. The management mechanisms may be different in different networks, and may have different parameters controlling the service, depending the application. A translation/mapping function may be provided for the interworking between the mechanisms and parameters used within the UMTS 2 and an external IP bearer service. With regards to the embodiments of the present invention, the BS manager may used to generate and add the notifications in messages in a node and to interpret the messages and the additional information included in the messages in the node receiving the message.

As shown by FIG. 1, the BS Managers may be located in the UMTS network in the gateway node 16 and the mobile station 1. The split of the BS Manager between the transceiver device part and other terminal equipment (TE) of the mobile station is implementation specific. The terminal equipment (TE) may comprise devices such as a laptop computer connected to the transceiver device. The BS manager function 11 may be implemented in either of the transceiver part or in the TE part of the mobile station, or may be distributed between the various part of the mobile station. If a BS manager exists both in the mobile station 1 and the gateway node 16, these IP BS Managers may communicate directly with each other by using relevant signalling protocols. Different networks may use different techniques for the functions thereof, and thus a translation function may be required between the terminating nodes of the bearer. For example, whenever resources that are not owned or controlled by the UMTS network are required to provide the end-to-end QoS, it is necessary to interwork with an external resource manager that controls those resources.

The above described embodiment enable the mobile station 1 to signal its requirements regarding the end-to-end QoS negotiation to the GGSN 16. In some application the user does not have to pay for end-to-end QoS if the user does not need any end-to-end features. In addition, the GGSN does not need to unnecessarily negotiate a QoS. Resources in the external networks may also be saved if resources are only reserved in instances where the user actually needs the resources. In some embodiments the GGSN 16 may indicate to the mobile station 1 the mechanism it is using for the end-to-end QoS, and/or if the GGSN has the necessary capability or not. In some embodiments the indications may enable the mobile station to make decision whether the mobile station wants to rely on the GGSN's capabilities or not. The GGSN may also indicate the status of the end-to-end QoS negotiation to the mobile terminal. Based on this the mobile station 1 may make a decision whether to start sending data or to tear down the relevant PDP context again. The mobile station may also determine from the information from the gateway node if a PDP context activation failed due to a lack of resources in the UMTS network or a lack of resources in the external networks.

The data is described as being in packet form. In alternative embodiments of the invention the data may be sent in any suitable format.

The embodiment of the invention has discussed the end-to-end connection between the mobile station and a gateway node. Embodiments of the present invention can also be applicable to other type of terminals and other network elements where applicable. For example, as briefly mentioned above, the serving controller 14 may also add information to the messages, for example when subscription or identity checking is applied to the traffic in the system.

It is also noted herein that while the above describes exemplifying embodiments of the invention, there are several variations and modifications which may be made to the disclosed solution without departing from the scope of the present invention as defined in the appended claims.

The invention claimed is:

1. A method comprising:
Generating a message associated with provisioning control of a data bearer between a first node and a second node;
Adding to the message information associated with a quality-of-service function of the data bearer;
Transporting the message between the first and second nodes; and
Assigning either the first node or the second node to control the quality-of-service function of the data bearer based on said information added in the message 2. The method of claim 1, wherein the information is configured to instruct that the first node to control at least one feature of the quality-of-service function.

3. The method of claim 1, wherein the information is configured to instruct the second node to control at least one feature of the quality-of-service function.

4. The method of claim 1, wherein the first node comprises a mobile station.

5. The method of claim 1, wherein the second node comprises a gateway node of a communication system.

6. The method of claim 1, wherein the controlling of the quality-of-service function comprises controlling the quality-of-service function during set-up of the data bearer.

7. The method of claim 1, wherein the provisioning the control of the data bearer comprises controlling negotiations between at least the first and the second nodes regarding the quality-of-service function.

8. The method of claim 1, wherein the information comprises an indication of at least one quality-of-feature feature controlled by the second node.

9. The method of claim 1, wherein the information comprises an indication of mechanisms the first node uses for controlling the quality-of-service function.

10. The method of claim 1, wherein the information comprises an indication of mechanisms the first node uses for controlling the quality-of-service function.

11. The method of claim 1, wherein the information comprises an indication of mechanisms the second node is enabled to use for controlling the quality-of-service function.

12. The method of claim 1, wherein the information comprises an indication of mechanisms the second node uses for controlling the quality-of-service function 13. The method of claim 1, wherein the information comprises status of negotiations that are associated with the quality-of-service function of the data bearer.

14. The method of claim 13, wherein the status of the negotiations is defined by the second node.

15. The method of claim 8, wherein the indication comprises a flag.

16. The method of claim 8, wherein the indication comprises a numeric value.

17. The method of claim 1, wherein the information is added to the message by the first node.

18. The method of claim 1, wherein the information is added to the message by the second mode.

19. The method of claim 1, wherein the second node requests the first node to indicate when the first node is configured to control the quality-of-service function.

20. The method of claim 1, wherein the message associated with activation of the data bearer comprises a data bearer activation protocol.

21. The method of claim 1, wherein the message comprises a packet data protocol context activation message.

22. The method of claim 1, wherein the data bearer is an end-to-end data bearer.

23. The method of claim 1, wherein the message comprises a data bearer control protocol.

24. The method of claim 1, wherein the message comprises at least one of the following context activation protocol messages: request to activate a packet data protocol context; request to create a packet data protocol context; response to a request to create a packet data protocol context; and response for accepting a request to activate a packet data protocol context.

25. The method of claim 1, wherein the message is further associated with a modification of the data bearer, and the message comprises a data bearer modification protocol.

26. The method of claim 22, wherein a similar quality-of-service level is negotiated for the end-to-end bearer throughout a connection between the nodes terminating the end-to-end bearer.

27. The method of claim 1, wherein the information is included in the message as quality-of-service parameter.

28. The method of claim 1, wherein the provisioning of the quality-of-service function comprises a resource reservation protocol.

29. The method of claim 1, wherein the first node and the second node belong to a first communication network and the information transported between the first and the second nodes relates to negotiations concerning the responsibility to negotiate with a node in a second communication network.

30. The method of claim 29, wherein the data bearer is provided between the first node and a node of the second communication network.

31. The method of claim 1, wherein at least one of the first node and the second node is provided with a bearer service manger function for controlling the bearer service.

32. An apparatus, comprising:
A controller configured to:
    Generate a message associated with control of a data bearer between the first node and a second node, and
    Add, to the message, information comprising a responsibility to control at least one quality-of-service feature that is associated with the data bearer,
Wherein one of either said first node or said second node is configured to control the at least one quality-of-service function of the data bearer based on said information added in the message, and wherein the information added in the message comprises a specification of whether the first node or the second node controls the quality-of-service function.

33. The apparatus of claim 32, wherein the first node comprises a mobile station and the second node comprises a gateway node of a communication system.

34. The apparatus of claim 32, wherein the data bearer is an end-to-end data bearer.

35. The apparatus of claim 32, wherein the controller is configured to control the quality-of-service function during set-up of the data bearer.

36. The apparatus of claim 32, wherein the information in the message comprises:
An indication that at least one quality-of-service feature is controlled by the second node;
An indication of mechanisms the first node is enabled to use for controlling the quality-of-service function;
An indication of mechanisms the first node uses for controlling the quality-of-service function;
An indication of mechanisms the second node uses for controlling the quality-of-service function;
An indication of mechanisms the second node uses for controlling the quality-of-service function;
A status of negotiations that are associated with the quality-of-service function of the data bearer; and
A quality-of-service parameter.

37. The apparatus of claim 32, wherein the message associated with activation of the data bearer comprises a data bearer activation protocol.

38. The apparatus of claim 32, wherein the message is further associated with a modification of the data bearer, and the message comprises a data bearer modification protocol.

39. The apparatus of claim 32, wherein at least one of the first node and the second node is provided with a bearer service manager function for controlling the bearer service.

40. The apparatus of claim 39, wherein the bearer service manager function is configured to add information in the message.

41. The apparatus of claim 36, wherein the bearer service manager function comprises a universal mobile telecommunications system bearer service manager.

42. The apparatus of claim 32, wherein the first node and the second node belong to a first communication network and the information to be transported between the first and second nodes comprises negotiations concerning the responsibility to negotiate with a node in a second communication network.

43. An apparatus comprising:
A management means for managing a data bearer between a first communications system comprising a plurality of nodes and a second communications system, wherein the management means comprises:
First generating means for generating a control protocol message that provisions control of the data bearer to one of said plurality of nodes in the first communications system;
Second generation means for generating and adding to the message information comprising a responsibility of said one of the plurality of nodes to control at least one quality-of-service function of the data bearer; and Assigning means for assigning one of the plurality of nodes with a responsibility of controlling quality-of-service.

44. An apparatus comprising:

Message generating means for generating a control protocol message configured to provision control of a data bearer between a first network node and a second network node;

Message adapting means for generating and adding to the message information regarding control of at least one quality-of-service function of the data bearer; and Assigning means for assigning the first network node with a responsibility of controlling quality-of-service.

45. The apparatus of claim 44, wherein the message generation means for generating the control protocol message and the message adapting means for adding to the message the information comprise a data bearer service manager function of the apparatus.

* * * * *